(12) United States Patent
Gaubatz et al.

(10) Patent No.: US 8,594,453 B2
(45) Date of Patent: Nov. 26, 2013

(54) METHOD OF ROBUST ALIGNMENT AND PAYLOAD RECOVERY FOR DATA-BEARING IMAGES

(75) Inventors: Matthew D. Gaubatz, Seattle, WA (US); Robert Alan Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/212,658

(22) Filed: Aug. 18, 2011

(65) Prior Publication Data

US 2013/0044948 A1    Feb. 21, 2013

(51) Int. Cl.
*G06K 9/40* (2006.01)
(52) U.S. Cl.
USPC .......................................................... 382/266
(58) Field of Classification Search
None
See application file for complete search history.

(56) References Cited

U.S. PATENT DOCUMENTS

| | | | |
|---|---|---|---|
| 5,949,055 A | 9/1999 | Fleet et al. | |
| 6,817,721 B1 | 11/2004 | Ulichney et al. | |
| 6,882,737 B2* | 4/2005 | Lofgren et al. | 382/100 |
| 6,921,172 B2 | 7/2005 | Ulichney et al. | |
| 7,018,050 B2 | 3/2006 | Ulichney et al. | |
| 7,046,401 B2 | 5/2006 | Dufaux et al. | |
| 7,130,491 B2 | 10/2006 | Cheng et al. | |
| 7,155,058 B2 | 12/2006 | Gaubatz et al. | |
| 7,453,449 B2 | 11/2008 | Ulichney et al. | |
| 7,830,418 B2 | 11/2010 | Ulichney et al. | |
| 2001/0045957 A1 | 11/2001 | Ulichney | |
| 2003/0202105 A1 | 10/2003 | Gaubatz et al. | |
| 2004/0179752 A1 | 9/2004 | Cheng et al. | |
| 2005/0001991 A1 | 1/2005 | Ulichney et al. | |
| 2005/0052618 A1 | 3/2005 | Ulichney et al. | |
| 2006/0061604 A1 | 3/2006 | Ulichney et al. | |
| 2006/0109286 A1* | 5/2006 | Damera-Venkata et al. | 345/690 |
| 2007/0252906 A1 | 11/2007 | Ulichney et al. | |
| 2009/0129670 A1 | 5/2009 | Zandifar et al. | |
| 2011/0001850 A1 | 1/2011 | Gaubatz et al. | |
| 2011/0069328 A1 | 3/2011 | Ulichney et al. | |
| 2011/0142337 A1 | 6/2011 | Deonarine et al. | |

FOREIGN PATENT DOCUMENTS

WO    WO0231752    4/2002

OTHER PUBLICATIONS

McGuire, Morgan, "An image registration technique for recovering rotation, scale and translation parameters," NEC Tech Report, pp. 1-46, Mar. 25, 1998.

Belongie, Serge, et al., "Shape Matching and Object Recognition Using Shape Contexts," IEEE Transactions on Pattern Analysis and Machine Intelligence, vol. 24, No. 24, pp. 509-522, Apr. 2002.

(Continued)

*Primary Examiner* — Stephen R Koziol
*Assistant Examiner* — Amandeep Saini (57) ABSTRACT

An example provides a system and method of robust alignment and payload recovery for data-bearing images. The method includes digitizing a printed version of a stegatone, computing the transformation parameters of the stegatone, and processing individual local regions of the stegatone to determine local transformation parameters. The method also includes performing an alignment evaluation to compute a metric value that represents the quality of a local alignment between a reference halftone and the stegatone. Further, the method includes selecting alignment parameters based on optimization of the metric value, mapping the shift of clustered-dots in each cell in comparison to the reference halftone, and recovering the payload by decoding the stegatone.

18 Claims, 6 Drawing Sheets

(56) References Cited

OTHER PUBLICATIONS

Lowe, David G., "Distinctive Image Features from Scale-Invariant Keypoints," International Journal of Computer Vision, vol. 60, No. 2, pp. 91-110, 2004.

Xu, Jianyun, et al., "JPEG Compression Immune Steganography Using Wavelet Transform," Proceedings of the International Conference on Information Technology: Coding and Computing, Las Vegas, Nevada, Apr. 5-7, 2004, vol. 2, pp. 704-708.

Simske, Steven J. et al., "Digital Capture for Automated Scanner Workflows," Proceedings at DocEng, Milwaukee, Wisconsin, pp. 175-176, Oct. 28-30, 2004.

Yang, Chyuan-Huei Thomas, et al., "Reliable Image Matching via Modified Hausdorff Distance with Normalized Gradient Consistency Measure," 3rd International Conference on Information Technology, Research, and Education, pp. 158-161, Jun. 2005.

Mikolajczyk, Krystian, et al., "A Performance Evaluation of Local Descriptors," IEEE Transactions on Pattern Analysis and Machine Intelligence, vol. 27, No. 10, pp. 1615-1630, Oct. 2005.

Simske, Steven J., et al., "Document Analysis System for Automating Workflows," Lecture Notes in Computer Science, vol. 3872, Document Analysis Systems VII, pp. 588-592, 2006.

Solanki, Kaushal, et al., "'Print and Scan' Resilient Data Hiding in Images," IEEE Transactions on Information Forensics and Security, vol. 1, No. 4, pp. 464-478, Dec. 2006.

Ulichney, Robert, et al., "Tracing the Source of Printed Documents with Edge-Refined Stegatones," HP Imaging and Color Symposium, Sep. 8, 2010.

Ulichney, Robert, et al., "Encoding Information in Clustered-Dot Halftones," Presented at the 26th International Conference on Digital Printing Technologies, Sep. 19-23, 2010.

Chiew, Kang Leng, et al., "Identifying Steganographic Payload Location in Binary Image," PCM '10 Proceedings of the 11th Pacific Rim Conference on Advances in Multimedia Information Processing: Part I, Shanghai, China, Sep. 21-24, 2010, pp. 590-600, Published by Springer-Verlag, Berline, Heidelberg, 2010.

Tzimiropoulos, Georgios, et al., "Robust FFT-Based Scale Invariant Registration with Image Gradients," IEEE Transactions on Pattern Analysis and Machine Intelligence, vol. 32, No. 10, pp. 1899-1906, Oct. 2010.

* cited by examiner

METHOD OF ROBUST ALIGNMENT AND PAYLOAD RECOVERY FOR DATA-BEARING IMAGES

BACKGROUND

While barcodes are a common means for encoding information in printed material, they can be obvious and are often unattractive. Therefore, if an image is to be a part of the composition of a printed label or page, a method of hiding information within the image may be used as an alternative to barcoding. Information may be encoded in the halftone of an image, using techniques such as clustered-dot halftoning. The process takes any grayscale image and a payload of data to be encoded therein as input, and produces a bitonal clustered-dot halftone of that image with selected halftone clusters shifted to carry varying numbers of bits from the payload. The small size and large number of clustered-dot cells in printed halftones allow the printer/encoded bit density to be quite high, typically over 2000 bytes/square-inch. The result of this encoding process is a data-bearing steganographic halftone, or stegatone.

Stegatones are used to convey digital information through a printing-imaging cycle via manipulating the halftone structure associated with a given image, or carrier. In order to extract this information from the halftone while maintaining maximum storage efficiency of the carrier, it is necessary to align a printed, imaged carrier with a reference halftone image created in the process of printing the carrier. However, proper alignment of the carrier stegatone with the reference halftone may present a challenge, making it difficult to effectively decode data-bearing images.

BRIEF DESCRIPTION OF THE DRAWINGS

Certain examples are described in the following detailed description and in reference to the drawings, in which.

DETAILED DESCRIPTION OF SPECIFIC EXAMPLES

An example described herein provides a system and method for aligning and decoding a data-bearing image or steganographic halftone in order to achieve payload recovery. As used herein, the term "steganographic halftone" or "stegatone" refers to a data-bearing image that is rendered as a clustered-dot halftone, where information is embedded in tiny shifts in individual halftone clusters.

Stegatones are useful for conveying digital information through the printing-imaging cycle by altering the halftone structure of a given image or carrier to encode data. Encoding is the process of manipulating the halftone structure of an image or carrier to facilitate the transmission of hidden information, while decoding is the process of recovering the hidden information from an image or carrier. Decoding may become difficult once the stegatone has been altered by the printing-imaging cycle. Proper alignment of the stegatone with the reference halftone facilitates efficient recovery of the payload. The payload is the digital data or information which is contained within the stegatone.

As used herein, the term "halftoning" refers to a process that creates the illusion of continuous-tone images by the arrangement of binary picture elements, such as ink drops. Halftoning may also be referred to as spatial dithering. Spatial dithering may employ several methods, including clustered-dot halftoning or dispersed-dot halftoning methods, which include turning on the output bit for a pixel if the intensity level is greater than the threshold of a particular matrix element at that pixel position. Halftoning is the process of producing the visual perception of continuous-tone images from the arrangement of bitonal pixels. "Dispersed-dot halftoning" refers to the class of techniques in which the bitonal pixels are individually arranged homogeneously. The term "clustered-dot halftoning" refers the class of techniques in which bitonal pixels are locally grouped to form contiguous dots of varying size. Clustered-dot halftoning is used for traditional offset printing, as well as both dry toner and liquid toner electrophotographic processes, because isolated pixels are often too fragile to survive the print process.

In an example, a method is described which enables automated alignment of the carrier stegatone with the reference halftone, allowing for accurate reconstruction of the stegatone payload. The term "alignment" describes determining the proper halftone cell boundaries with respect to the cell boundaries in the reference halftone. The method may enable high-fidelity transmission of payload information, avoid compensating for complicated global non-linear distortions, accommodate for both affine and non-affine distortions in printer and scanner, and function without user intervention. As used herein, the term "affine" refers to a linear transformation followed by a translation. The linear transformation may include rotation, scaling, or shear, while the translation may also be referred to as a shift. The term "non-affine" refers to all other types of image distortions, such a skewing or warping, among other non-linear effects.

In one example, the stegatone may be digitized using a flatbed scanner. In this case, the moving mirror within the flatbed scanner may fail to scale the image properly. When considering clustered-dot shifts on the order of $1/600^{th}$ of an inch, warping may be detected within the image. Therefore, the current method may be used to decode the image despite the warping and other distortions induced by the scanning process. In another example, the stegatone may be digitized by a camera.

In an example, the recovery of the stegatone payload involves two main components, an alignment system, which registers the stegatone with respect to a reference halftone, and a decoding system, which maps regions of the aligned stegatone to shifted versions of the corresponding regions of the reference halftone. The alignment approach relies on global spatial transformation parameter estimation, followed by local metrics-based, or measurement-based, refinement of spatial transformation parameters. "Global" refers to an entire image, while "local" refers to a specific region of an image.

In an example, the global spatial transformation is affine. Global affine parameter estimation involves positioning the stegatone so that, for instance, the edges are in line with those of the reference halftone and determining the approximate alignment of the overall images. This operation may provide an initial estimate of the distortions and other errors contained within the stegatone. Local metrics-based refinement of the spatial transformation parameters may involve determining the alignment of vertical strips of the stegatone with respect to corresponding vertical strips of the reference halftone. In another example, this refinement process may involve determining alignment of regions in a grid pattern. In yet another example, the refinement process may involve determining alignment of objects determined via higher-level analyses. A "metric," or "measurement," refers to any of a number of different methods for analyzing the quality of the candidate set of alignment parameters, including a method of computing pixel-based correlations between the two images or a method of determining statistics of centroids of all relevant dot clusters, among others.

In order to make transmission of the message more robust, different types of coding may be layered on top of the message, such as Turbo coding, Reed-Solomon coding, or low-density parity check (LDPC) coding, among others. In an example, this type of coding may protect the message and combat errors that occur in the printing-imaging cycle by protecting the message with redundant bits. For example, a hundred bit message may be encoded as a thousand bit message, wherein the hundred bit message is repeated ten times. Adding redundancies of this type may protect the message by increasing the likelihood that the message will be decoded properly despite distortions or errors in alignment. Turbo coding refers to a class of high-performance error correction codes (ECC), and associated iterative decoding procedures, which allow for the transmission of an information signal over a noisy channel. Reed-Solomon coding is a type of non-cyclic error correction coding that can detect and correct random symbol errors within a source in order to recover an original message. LDPC coding is a type of linear error correcting coding that, like Turbo coding, is used to transmit a message over a noisy channel robustly and efficiently. Turbo, Reed-Solomon, LDPC and other codes all have different strengths and weaknesses with respect to communicating over a printing-imaging cycle.

Figure 1:
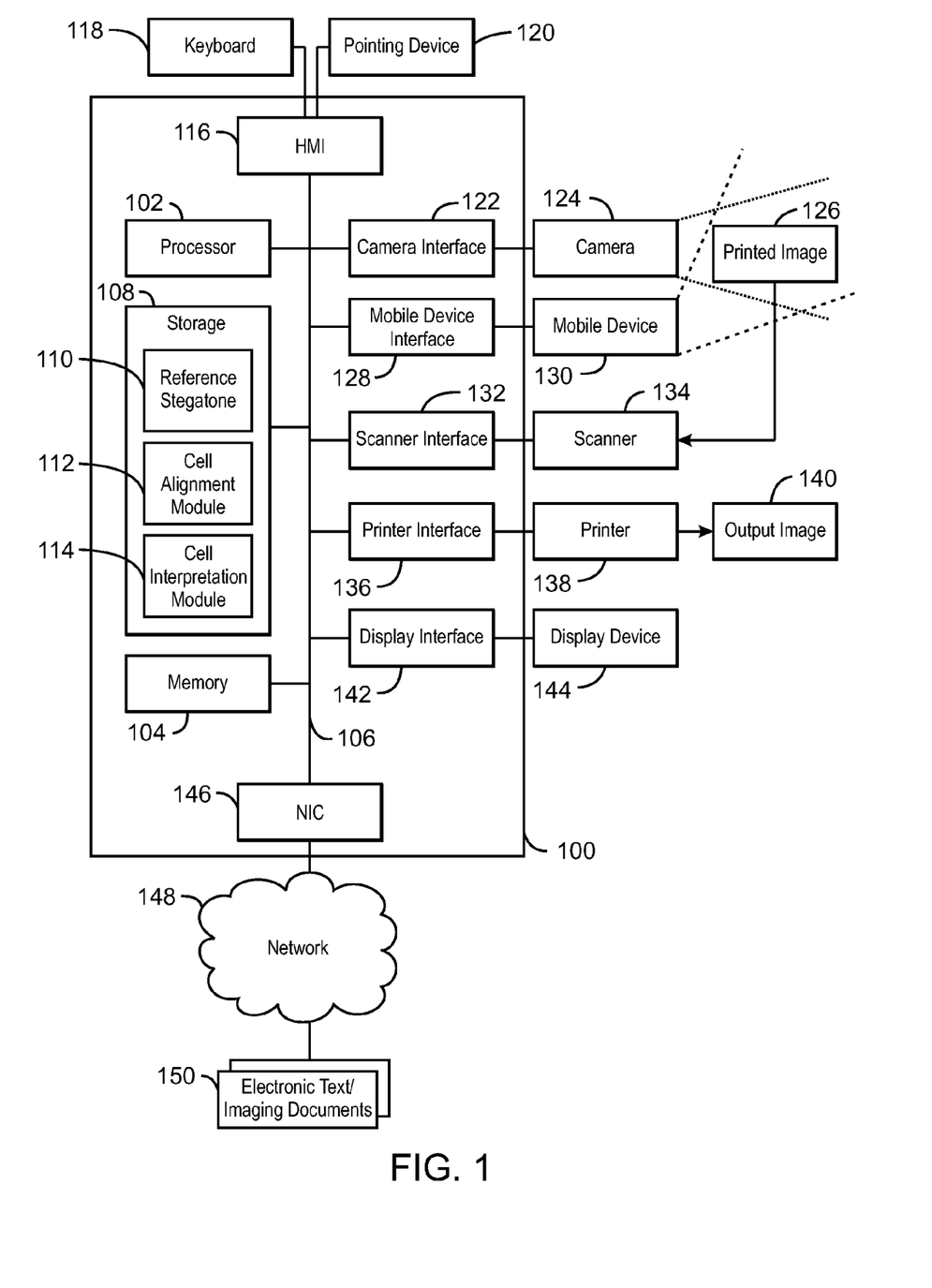
FIG. 1 is a block diagram of a computer system in which robust alignment and payload recovery for data-bearing steganographic halftones, or stegatones, may be achieved through a system and method for effective halftone alignment and decoding, in accordance with examples.

FIG. 1 is a block diagram of a computer system 100 in which robust alignment and payload recovery for data-bearing steganographic halftones may be achieved through a system and method for effective halftone alignment and decoding, in accordance with examples. The computer system may include a processor 102 that is adapted to execute stored instructions, as well as a memory device 104 that stores instructions that are executable by the processor. The processor 102 can include a single core processor, a multi-core processor, a computing cluster, or any number of other configurations. The processor 102 may be connected through a bus 106 to various devices, including a memory device 104.

The memory device 104 can include random access memory (RAM), read only memory (ROM), flash memory, or any other suitable memory systems. The instructions implement a method that includes aligning a carrier stegatone with a reference halftone and decoding the stegatone to recover the payload.

The system may also include a storage device 108 adapted to store the reference stegatone 110, a cell alignment module 112, and a cell interpretation module 114. The storage device 108 can include a hard drive, an optical drive, a thumbdrive, an array of drives, or any combinations thereof. A human machine interface 116 within the computer system 100 may connect the system to a keyboard 118 and pointing device 120, wherein the pointing device 120 may include a mouse, trackball, touchpad, joy stick, pointing stick, stylus, or touchscreen, among others.

The computer system 100 may also include a camera interface 122 adapted to connect the system to a camera 124. The camera 124 may be used to capture a digitized version of a printed stegatone 126. In addition, the computer system 100 may include a mobile device interface 128 adapted to connect the system to a mobile device 130, which may also be used to capture a digitized version of a printed stegatone 126. A scanner interface 132 may be included within the computer system 100 and adapted to connect the system to a scanner 134, which may be used to digitize a printed stegatone 126. The printed stegatone 126 may include any grayscale image, including photographs, graphics, or a constant area such as the background of a page, among others. One non-limiting example of a printed stegatone 126 is a company logo storing encoded information.

A printer interface 136 may also be connected to the computer system 100 through the bus 106 and adapted to connect the computer system 100 to a printing device 138, wherein the printing device 138 may include a liquid inkjet printer, solid ink printer, large-scale commercial printer, thermal printer, UV printer, or dye-sublimation printer, among others. The printing device may be used to produce an output image 140 of an encoded stegatone. In an example, the printer that is used to print an output of the stegatone may be linked to a separate computer system, instead of being linked to the same computer system that was used to recover the payload data.

The computer system 100 may also be linked through the bus 106 to a display interface 142 adapted to connect the computer system 100 to a display device 144, wherein the display device 144 may include a computer monitor, camera, television, projector, or mobile device, among others. The display device 144 may be used to display an output of the encoded stegatone.

A network interface card (NIC) 146 is adapted to connect the computer system 100 through the bus 106 to a network 148. Through the network 148, electronic text and imaging input documents 150 may be downloaded and stored within the computer's storage system 108.

Figure 2:
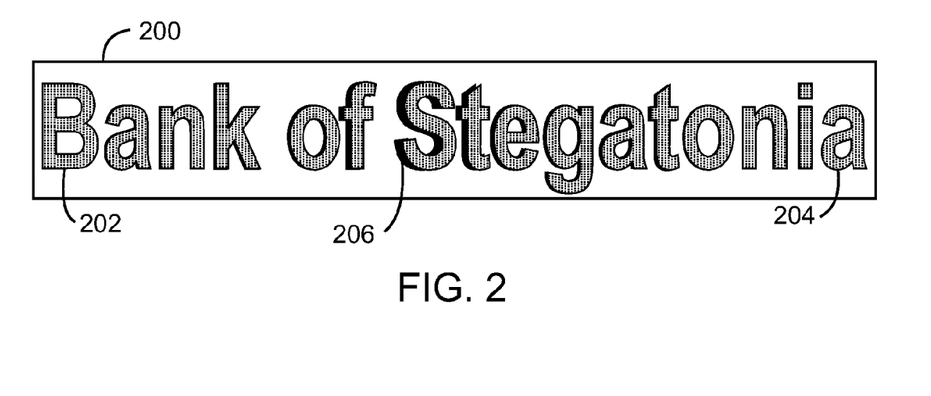
FIG. 2 illustrates a common alignment issue which is encountered when attempting to decode data-bearing stegatones, in accordance with an example.

FIG. 2 is a textual image 200 that illustrates a common alignment issue which is encountered when attempting to decode steganographic halftones. The figure shows an example of non-affine warping induced by the printing-imaging process. The figure contains a globally-aligned stegatone and reference halftone. The edges of the image 202, 204 are properly aligned, while the region in the center 206 of the image is not. The misalignment of the images may be due to printer behavior, scanner behavior, or any combination thereof. Because the decoding of a stegatone often relies on the detection of single-pixel shifts within the image, this type of misalignment may be enough to compromise the ability to recover the payload of the stegatone in many cases. This example emphasizes the need for spatially-adaptive estimation of transformation parameters, as revealed by the current method.

Figure 3:
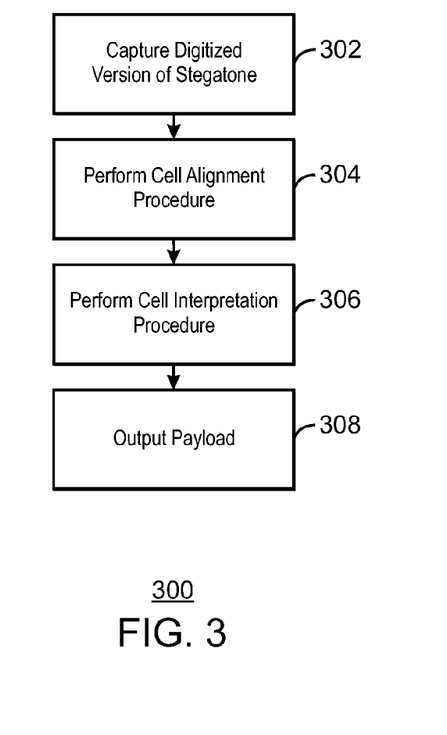
FIG. 3 is a process flow diagram 300 showing a method for aligning and interpreting, or decoding, the information contained within a scanned stegatone, in accordance with examples.

FIG. 3 is a process flow diagram 300 showing a method for aligning and interpreting, or decoding, the information contained within a scanned stegatone. At block 302, a digitized version of a stegatone may be captured. At block 304, a cell alignment procedure may be performed to align the stegatone with a reference halftone. At block 306, a cell interpretation procedure may be performed to decode the stegatone. At block 308, an output of the payload of the stegatone may be obtained. It should be understood that the process flow diagram 300 is not intended to indicate that the method must be executed in any particular order.

Figure 4:
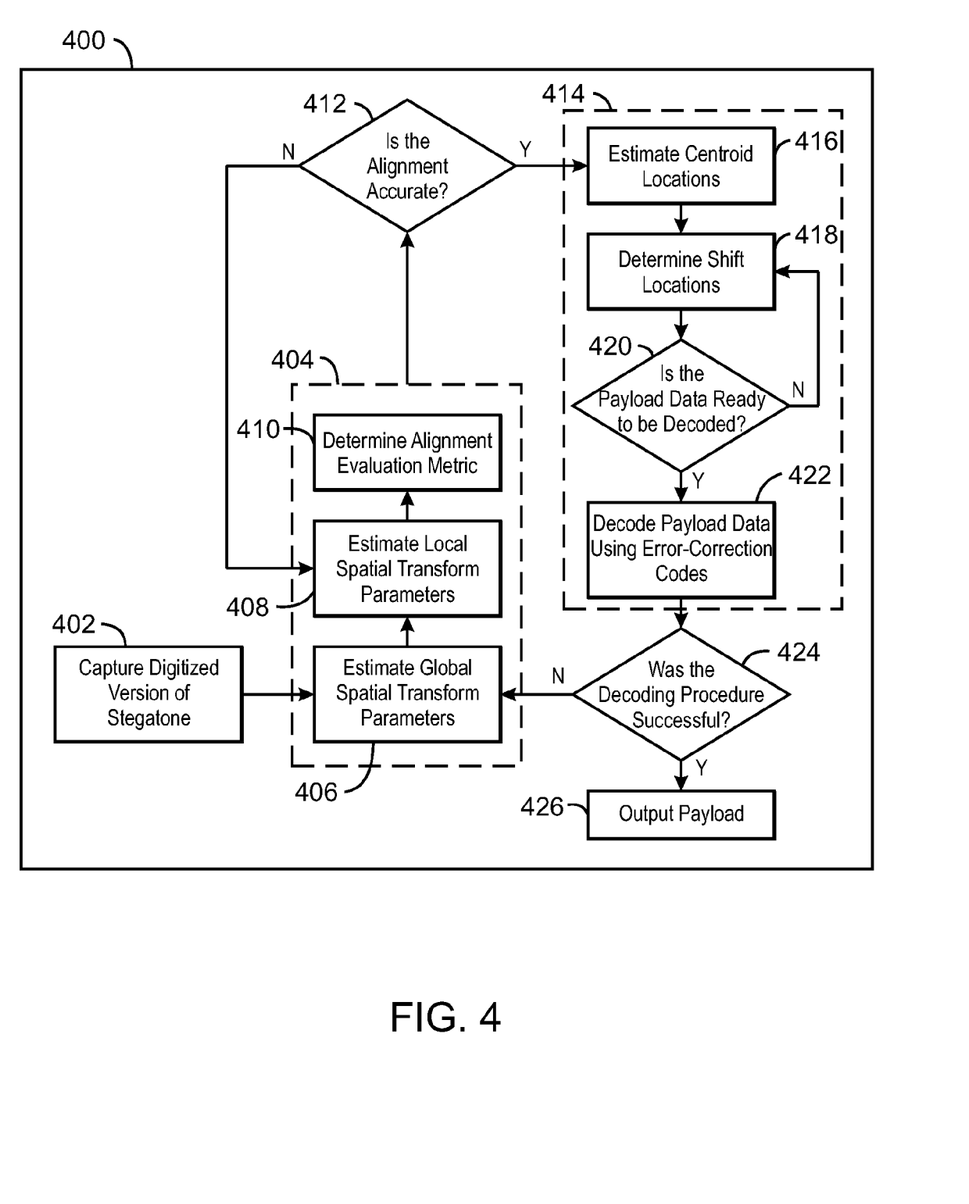
FIG. 4 is a process flow diagram showing a method for properly aligning and interpreting, or decoding, the information contained within a scanned stegatone for payload recovery, in accordance with examples.

FIG. 4 is a process flow diagram 400 showing an example of a method for aligning and interpreting or decoding the information contained within a scanned stegatone. At block 402, a digitized version of a stegatone may be scanned or captured from a camera, mobile device, or other imaging device. The alignment of the stegatone with respect to a reference halftone may be determined through a cell alignment system 404.

Within the cell alignment system 404, the global spatial transform parameters are estimated at block 406. In an example, estimating the global spatial transform parameters may involve determining the approximate scale and rotation parameters of the stegatone. In one example, the global scale and rotation parameters may be generated using Fourier-based techniques. Examples are not limited to the use of Fourier-based methods; any number of different techniques or methods may be used to estimate the global spatial transform parameters. In another example, the cell alignment system 404 may be simplified by assuming that no rotation or global scaling has occurred, other than a potential expansion or dilation in the vertical or horizontal direction, which can be assessed. In this case, estimation of the global spatial transform parameters at block 406 may not be necessary.

At block 408, the local spatial transform parameters are estimated. In an example, estimating the local spatial transform parameters may involve processing individual vertical strips of the stegatone. This stage may be performed by iterating over a set of individual transform parameters and selecting the one which optimizes an alignment evaluation metric that predicts the actual bit-decoding performance associated with the cells in the strip. The alignment evaluation metric may be utilized to assign parameters according to those that result in the smallest distances between corresponding clustered-dots in the stegatone and candidate shifted cells associated with the reference halftone. This process may involve mapping clustered-dots of the stegatone to candidate shifted versions of the clustered-dots of the reference halftone based on the most likely shift positions as revealed by the metric values. Local portions of the acquired stegatone may be mapped to the corresponding local portions of the reference halftone. Then, at block 410, the alignment evaluation metric may be computed to analyze the quality of the candidate local alignment. The system may record the metric value for all possible candidate alignments and select the alignment parameters that optimize the metric value. In one example, the alignment evaluation metric may be computed at block 410 using a pixel-based correlation to compare the transformed vertical strip of the stegatone to the corresponding section of the reference halftone. In another example, the metric may be computed at block 410 by determining the centroids of all relevant dot clusters. One exemplary metric that has demonstrated strong performance may be computed by determining the centroid of clustered-dots in each cell, and the distance between each of the centroids of clustered-dots in the stegatone and the corresponding centroids of the nearest candidate shifted clustered-dots in the reference halftone. Then, the average distance over all cells in each local region may be measured.

In another example, the alignment evaluation metric may be computed at block 410 by using pixel-based correlations to refine the estimated global spatial transform parameters over a coarse set of transform adjustments, such as horizontal and vertical offsets. Then, a more sophisticated metric may be used to optimize these adjustments with a finer set of refinements, such as horizontal and vertical offsets, as well as variations in vertical scale. In still another example, payload data may be protected using Turbo, Reed-Solomon, or LDPC codes, among others, starting at the encoder. The message bits may be converted to code words by mapping the payload data in an order that processes one region at a time. There is flexibility in choosing the order that regions are traversed, but an efficient use of the coding scheme may be achieved if samples in local stegatone regions are coded in contiguous fashion. In other words, for this particular example to be most efficient, steps must be taken to enforce certain behavior at the encoder. In one example, regions of each locally-aligned vertical strip are coded prior to traversing regions in other vertical strips of the image. In another example, the metric computation may be performed at block 410 by utilizing a hard-decision decoding scheme to maps shifts to digital data and counting the number of parity check errors found in all complete codewords that are included in a local region.

When each iteration of the cell alignment procedure is complete, the alignment results may be analyzed to determine the degree of accuracy at block 412. For example, the system may select the transformation parameters associated with the fewest number of parity check errors, transform the corresponding portion of the acquired carrier, and perform soft- or hard-decision decoding of all cell shifts in the vertical strip. Once all parts of the stegatone have been processed, the payload as a whole may be reconstructed. Note that the local alignment module may operate on different regions serially, using parallel processing, in an iterative fashion, or any combination thereof. If the alignment is determined to be inaccurate at block 412, the local spatial transform parameters and alignment evaluation metric may be recomputed at blocks 408 and 410, respectively. The iterations in blocks 408-412 may be repeated until an acceptable degree of accuracy is reached for the alignment. If the alignment is determined to be accurate at block 412, the cell alignment information may be passed to the cell interpretation system 414.

As shown in FIG. 4, the stegatone may be decoded using a cell interpretation system 414. At block 416, the centroid locations of the clustered-dots may be estimated by analyzing pixels in each stegatone cell. Centroid locations of the clustered-dots in the reference halftone, or the candidate shifted versions of each halftone cell, may also be computed. The centroid locations are estimated to perform centroid matching and/or to analyze the quality of candidate decoding parameters. Determination of the centroids may involve binarizing each scanned cell.

At block 418, the shifts may be determined. In an example, this allows an estimate of the cell shift positions from which the embedded payload bits are derived. Data-bearing images are commonly created using "shift rules" to encode information into an image. The shift rules may be applied during the estimation of the shifts at block 418, allowing the cell interpretation system 414 to decode the stegatone by analyzing the shifts. In an example, shifts are determined by comparing the location of the centroid of each cell of the stegatone with the location of the centroid of each candidate shifted cell of the reference halftone. Centroid matching may be advantageous because it can be applied to any size aligned scan.

Once the shifts have been determined at block 418, the accuracy of the information may be analyzed at block 420 to determine if the payload data is ready to be decoded. In an example, the results of the centroid matching and subsequent shift estimations may be analyzed to determine whether the initial decoding procedure was successful by counting the number of parity check bits that are set and/or looking at the number of decoding errors estimated by the ECC scheme. In an example, if the estimations of the centroid locations and the shift locations are deemed to be sufficiently accurate, the payload data will be decoded using error-correction codes at block 422. Otherwise, the process will flow back to block 418 for another iteration, and the estimated shift locations will be recalculated.

In an example, decoding the payload data using error-correction codes at block 422 may involve applying iterative decoding techniques to the stegatone in order to recover the payload. During the decoding stage, the iteration procedure may continue until convergence is reached according to a predetermined standard, a certain estimated signal quality is attained, or a maximum number of iterations is reached. An example of one possible requirement for convergence may be obtaining zero errors for all parity checks. The required signal quality or maximum number of iterations may be specified according to user preferences. In another example, codes associated with non-iterative decoding procedures may be used for error protection, instead of techniques with iterative decoding procedures. In this case, the payload reconstruction may be accomplished by processing hard-decision shift estimates from each optimally aligned portion of the carrier. Once the cell interpretation system 414 is complete, the results are analyzed at block 424 to determine if the decoding procedure was successful.

Methods used herein may include, but are not limited to, any of the methods used to assess the alignment performance or readiness for decoding, possibly with different threshold parameters to determine what results are deemed accurate. Other methods may include evaluating any measurements taken during an iterative decoding procedure used to determine convergence. In an example, if the result is deemed to be accurate, the stegatone payload may be output at block 426 and sent to a display device, a printing device or any other type of output device. However, if the results are deemed to be inaccurate, the stegatone may be reanalyzed by starting over at the cell alignment system 404 and estimating the global spatial transform parameters again at block 406.

It should be understood that the process flow diagram 400 is not intended to indicate that the steps of the method must be executed in any particular order. For example, steps from the cell alignment system 404 may call upon steps from some of the same processes used by the interpretation system 414 at any time to verify the alignment of the stegatone with respect to the reference halftone. In addition, each of the decision blocks 412, 420, and 424 may or may not be called upon during any given cell alignment or cell interpretation procedure. In other words, the steps included in the process flow diagram 400 may not all be executed during the overall stegatone alignment and interpretation procedure.

Figure 5:
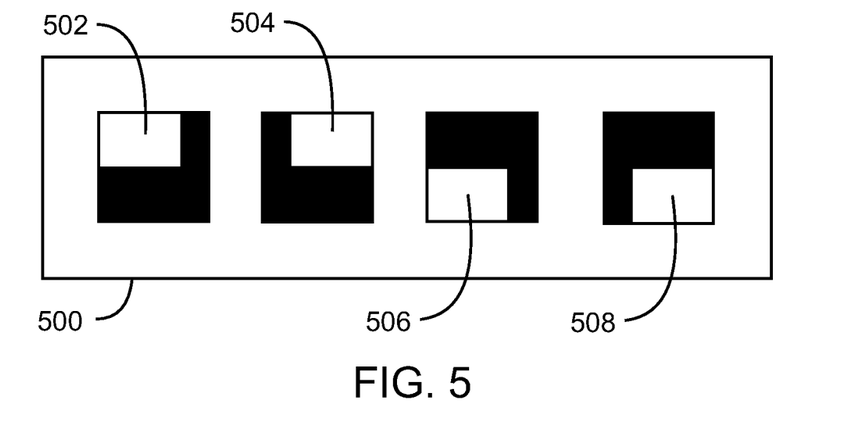
FIG. 5 shows an example of four shifted stegatone cells used for a two-bit transmission scheme, in accordance with examples.
Figure 6:
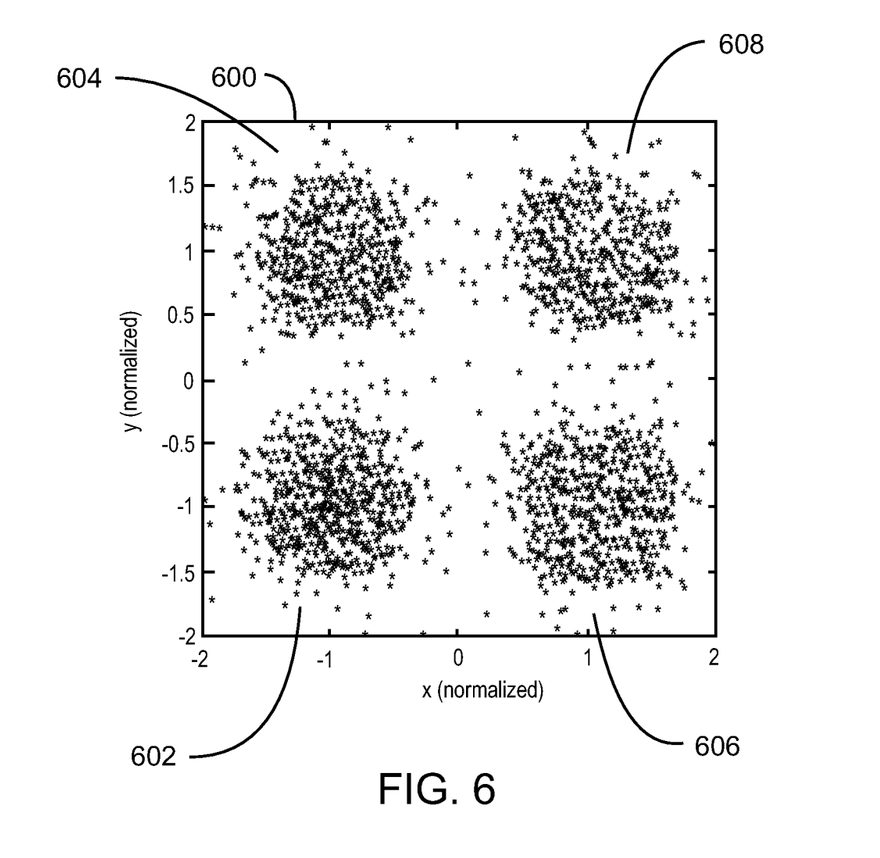
FIG. 6 is an example of a typical scatter plot for modulated digital data transmitted over a noisy channel.

FIG. 5 shows an example 500 of four shifted versions of a stegatone cell 502, 504, 506, 508 used for a two-bit transmission scheme. In this example, each of the cells in the carrier are capable of transmitting two bits, where the bits may be represented by shifting the associated cluster of pixels to either the right or left side and the top or bottom of the cell. In this case, in one example, the function of the payload recovery system may be understood as analogous to the function of the QPSK/4-QAM signal transmission scheme, as shown in FIGS. 5 and 6 and discussed below. As used herein, the acronym "QPSK" stands for Quadrature Phase Shift Keyed, and the acronym "QAM" stands for Quadrature Amplitude Modulation.

FIG. 6 is an example of a typical scatter plot for QPSK/4-QAM modulated digital data transmitted over a noisy channel. Many examples of Turbo- and LDPC-decoders operate on this type of data, which consists of noisy versions of digitally modulated data. QAM is an analog and digital modulation scheme, which doubles the effective channel bandwidth by combining two amplitude-modulated signals into a single channel. The two carrier waves are called quadrature components because they are out of phase with each other by ninety degrees. Digital phase-shift keying is a special case of QAM, in which the magnitude of the modulated signal is constant with only the phase varying. In this example, the QAM constellation consists of four phases which are clearly distinguishable in FIG. 6. The four phases are located at (−1, −1) 602, (−1, +1) 604, (+1, −1) 606, and (+1, +1) 608. The approximate centroids for each of the four regions 602, 604, 606, 608 are plainly visible. The usefulness of this general method with regard to the current method is illustrated by the similarities between FIG. 6 and FIG. 7, discussed below.

Figure 7:
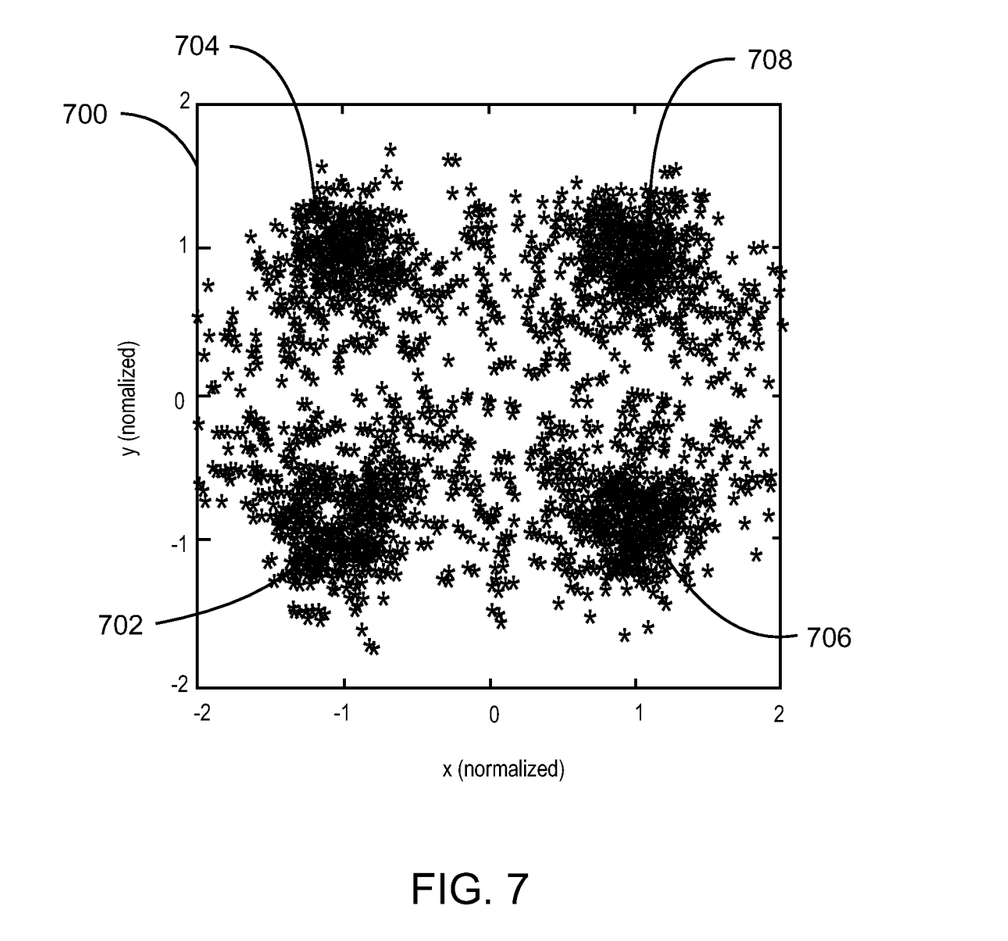
FIG. 7 is a scatter plot of noisy halftone cell centroid locations generated by the computer system from FIG. 1, plotted on a normalized axis, in accordance with examples.

FIG. 7 is a scatter plot 700 of noisy halftone cell centroid locations generated by the computer system from FIG. 1, plotted on a normalized axis. Each of the four centroids of the cells in FIG. 1 appear on the scatter plot at one of four possible locations, which include (−1, −1) 702, (−1, +1) 704, (+1, −1) 706, and (+1, +1) 708. According to this example, the input bit stream for the payload of a stegatone may be encoded, in a sense, as if it were a 4-QAM symbol sequence. This example provides an example of one method of decoding a stegatone to recover the payload, which is commonly utilized by Turbo- or LDPC-decoders. However, in many cases, even more efficiency may be achieved by using higher-dimensional message symbols.

Figure 8:
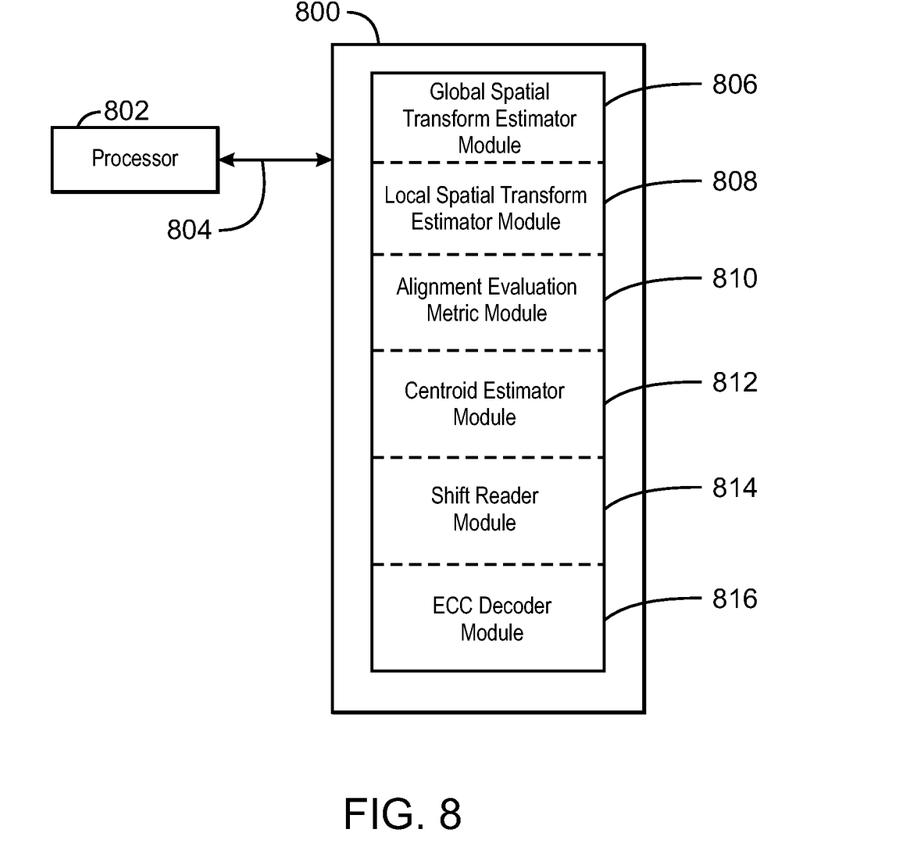
FIG. 8 is a block diagram showing a tangible, computer-readable medium that stores code adapted to properly align and recover the payload for data-bearing images, in accordance with examples.

FIG. 8 is a block diagram showing a tangible, computer-readable medium 800 that stores code adapted to properly align and recover the payload for data-bearing images. The tangible, computer-readable medium 800 may be accessed by a processor 802 over a computer bus 804. Furthermore, the tangible, computer-readable medium 800 may include code to direct the processor 802 to perform the steps of the current method.

The various software components discussed herein may be stored on the tangible, computer-readable medium as indicated in FIG. 8. For example, a Global Spatial Transform Estimator module 806 may be stored in a first block on the tangible, computer-readable medium 800. A second block may include a Local Spatial Transform Estimator module 808. A third block may include an Alignment Evaluation Metric module 810. A fourth block may include a Centroid Estimator module 812. A fifth block may include a Shift Reader module 814. Finally, a sixth block may include an ECC Decoder module 816. Examples are not limited to these arrangements, as any number of different combinations and arrangements may be used to perform the same functions.

In an example, the current method may be extended for use with different types of data or different use cases. Different types of data may include photos printed on consumer printers, documents created with enterprise printers, or magazines produced by digital presses. The content of each print may include graphic items, block text, or photographic imagery. In one use case, the decoder may access the reference halftone. A possible application may involve using stegatones to enhance the security of a family of printed packages. In a more specific use case, the same specific marking may be printed on each page, meaning that the reference halftone is always the same. In a reference-free use case, the reference halftone is unavailable and any metrics used to assess alignment quality cannot depend on the reference halftone. One example of this use case is when a cell phone camera analyzes a consumer photo print.

EXAMPLES

In an example, the efficacy of different error coding schemes was analyzed for a printer and scanner system, i.e., an HP LJ4345 printer and an HP G4050 scanner, discussed in FIG. 2 using the following procedure. One-hundred and twelve bytes of data associated with a typical record generated by a printing transaction was transmitted in a logo-based stegatone with a data carrying capacity of four-hundred and forty-eight bytes. Several methods of adding redundant bits to improve robustness were evaluated. Turbo codes offer some of the most competitive error coding schemes when used to protect large amounts of data. However, since the number of bits used for transmission is relatively low, and asymptotic trends may not apply, a number of different alternatives were investigated using this example. The tested methods used to improve robustness of transmission include repetition codes, Hadamard codes, a combination of Turbo and Hadamard codes, a combination of Turbo and Reed-Solomon codes and the placement of regularly spaced cells with pre-defined shifts to create patterns that are easier to locate during the alignment process, as shown in Table 1. To isolate the effects of the current alignment strategy, two versions of each stegatone were decoded. One version of the stegatone was aligned by the Cell Alignment System, and the other was aligned using fiducials to locate each cell of the stegatone accurately. As used herein, the term "fiducial" is used to describe a marker that may be used as a point of reference or measure in an image.

The results of this example are compiled in Table 1 and are reported for images scanned at 1200 dots per inch (DPI). The data include the information-theoretic capacity of the stegatone print-scan channel given the alignment scheme, the raw and final bit error rates (BERs), which represent the fraction of incorrectly decoded bits mapped from the stegatone shift positions and the fraction of incorrectly decoded payload bits after the application of any error correction scheme, as well as the final number of byte errors in the decoded payload. In several cases, with fiducial-assisted alignment, perfect transmission of the payload is achieved. Since a small percentage of bit errors can lead to a larger percentage of byte errors if the errors are evenly distributed, the combination of Turbo and Reed-Solomon coding offers a good trade-off between the ability to recover from both randomly distributed bit errors as well as bursts of bit errors. This particular protection scheme results in accurate transmission, even when fiducial markings are not used for alignment.

The amount of redundant information required may depend on the target application. In instances where borders or other structured data are present near a stegatone, fiducial-assisted alignment can possibly be employed. With respect to robustness, the use of fiducials may offer an advantage. For example, in this test, the information-theoretic capacity of the printing-imaging cycle channel decreases by almost twenty percent on average when fiducial markings are not used. It is worth noting that while using extra bits to create cells with pre-specified shifts results in the least robust overall protection scheme, doing so does create a channel with the highest capacity. These observations highlight the mutual importance of alignment and error coding strategies.

What is claimed is:

1. A method of robust alignment and payload recovery for data-bearing images, comprising:
   digitizing a printed version of a stegatone;
   computing global spatial transformation parameters of the stegatone;
   processing individual local vertical strips of the stegatone to determine local spatial transformation parameters;
   performing an alignment evaluation to compute a metric value that represents a quality of a local alignment between a reference halftone and the stegatone;
   selecting alignment parameters based on optimization of the metric value;
   mapping a shift of clustered-dots in each cell in comparison to the reference halftone; and
   recovering a payload by decoding the stegatone.

2. The method of claim 1, wherein digitizing of the stegatone comprises using a scanner, camera, mobile device, or other imaging device.

3. The method of claim 1, wherein computing the global spatial transformation parameters comprises computing scale parameters, translation parameters, shear parameters, rotation parameters or any combination thereof.

4. The method of claim 3, wherein computing the scale parameters and the rotation parameters of the stegatone comprises performing an initial evaluation of an alignment of the stegatone in comparison to the reference halftone to identify affine and non-affine transforms for mapping the stegatone to the reference halftone.

5. The method of claim 1, wherein determining the local spatial transformation parameters of the stegatone comprises performing an evaluation of an alignment of the stegatone to accurately determine shifts, scale differences, shears, rotations, or any combination thereof, by segmenting the stega-

TABLE 1

Decoding performance achieved with sample printing transaction record data in conjunction with five different redundancy schemes.

| Protection scheme | Fiducial-assisted alignment | | | | Blind alignment (without using fiducials) | | | |
| --- | --- | --- | --- | --- | --- | --- | --- | --- |
| | Channel capacity (bits/cell) | Raw BER | Final BER | # byte errors | Channel capacity (bits/cell) | Raw BER | Final BER | # byte errors |
| Repetition code | 1.78 | 0.0170 | 0.0045 | 3 | 1.51 | 0.0550 | 0.0156 | 8 |
| Hadamard code | 1.84 | 0.0140 | 0 | 0 | 1.40 | 0.0843 | 0.0134 | 7 |
| Turbo + Hadamard | 1.74 | 0.0229 | 0 | 0 | 1.38 | 0.0893 | 0.0190 | 9 |
| Turbo + Reed-Solomon | 1.73 | 0.0243 | 0 | 0 | 1.40 | 0.0776 | 0 | 0 |
| Alignment markers | 1.86 | 0.0092 | 0.0092 | 10 | 1.60 | 0.0419 | 0.0419 | 49 | tone into the individual vertical strips and comparing each individual vertical strip to the reference halftone.

6. The method of claim 1, wherein performing an alignment evaluation to compute a metric value comprises quantifying distances between candidate shifted clustered-dots associated with the reference halftone and nearest clustered-dots of the digitized stegatone.

7. The method of claim 6, wherein the metric value is minimized when corresponding regions of the candidate shifted clustered-dots associated with the reference halftone and the nearest clustered-dots of the digitized stegatone are exactly aligned and increases in value as the distance between the corresponding regions increases.

8. The method of claim 1, wherein selecting alignment parameters based on optimization of the metric value comprises assigning parameters based on optimal metric values computed by comparing clustered-dots of the stegatone and corresponding clustered-dots of the reference halftone, and/or of candidate shifted versions of the reference halftone.

9. The method of claim 1, wherein mapping the shift of clustered-dots in each cell in comparison to the reference halftone comprises performing an initial decoding procedure by determining differences between the aligned stegatone and the reference halftone.

10. The method of claim 1, wherein recovering the payload comprises using an error correction code to determine a number of bit errors in a string encoded by the stegatone and performing an iterative decoding technique.

11. The method of claim 10, wherein the iterative decoding technique comprises continuously iterating to determine errors in the alignment until convergence is reached, a certain estimated signal quality is attained, a maximum number of iterations is reached, or any combination thereof.

12. The method of claim 1, wherein recovering the payload of the stegatone comprises outputting the data encoded by the stegatone to an output device.

13. A system for recovering a payload for data-bearing images, comprising:
a processor that is adapted to execute stored instructions;
a memory device that stores instructions that are executable by the processor, the instructions comprising code configured to direct the processor to:
compute global transformation parameters of a stegatone;
compute local transformation parameters for individual vertical strips of the stegatone;
compute a metric value that represents an alignment between a reference halftone and the stegatone;
compute a location of the centroid of clustered-dots in each cell and determine a distance between each centroid and a corresponding centroid of the reference halftone;
identify shifts in the clustered-dots of the stegatone in comparison to the reference halftone; and
recover a payload of the stegatone.

14. The system of claim 13, further comprising a storage medium that stores the reference halftone, the stegatone, a cell alignment system, and a cell interpretation system.

15. The system of claim 13, wherein the instructions comprise code configured to direct the processor to identify scale and rotation parameters within the entire stegatone by comparing the stegatone to the reference halftone.

16. The system of claim 13, wherein the instructions comprise code configured to direct the processor to identify scale parameters, translation parameters, shear parameters, rotation parameters or any combination thereof within individual local regions of the stegatone by comparing local regions of the stegatone to corresponding local regions of the reference halftone.

17. The system of claim 13, wherein the instructions comprise code configured to direct the processor to recover the payload of the stegatone through a series of iterative decoding techniques.

18. A tangible, non-transitory computer-readable medium, comprising code to direct a processor to:
receive a digitized version of a stegatone from an input device;
compute global spatial transformation parameters of the stegatone;
process individual vertical strips of the stegatone to determine local spatial transformation parameters;
perform an alignment evaluation to compute a metric value that represents a quality of a local alignment between a reference halftone and the stegatone;
select alignment parameters based on optimization of the metric value;
map a shift of clustered-dots in each cell in comparison to the reference halftone; and
recover a payload of the stegatone.

* * * * *